(12) United States Patent  (10) Patent No.: US 8,210,000 B2
Prossor  (45) Date of Patent: Jul. 3, 2012

(54) BEAD FURNACE

(75) Inventor: Stephen Prossor, Victoria (AU)

(73) Assignees: Panalytical B.V., Almelo (NL); XRF Scientific Limited, Osborne Park (AU)

( * ) Notice: Subject to any disclaimer, the term of this patent is extended or adjusted under 35 U.S.C. 154(b) by 104 days.

(21) Appl. No.: 12/825,987

(22) Filed: Jun. 29, 2010

(65) Prior Publication Data

US 2011/0154858 A1 Jun. 30, 2011

(30) Foreign Application Priority Data

Jul. 3, 2009 (EP) .................................. 09164580

(51) Int. Cl.
C03B 19/10 (2006.01)
F27B 14/02 (2006.01)
(52) U.S. Cl. ............ 65/21.5; 432/156; 432/239; 65/142
(58) Field of Classification Search ...................... 65/142
See application file for complete search history.

(56) References Cited

U.S. PATENT DOCUMENTS

| 4,319,774 A | 3/1982 | Kavick | |
| 4,329,136 A | 5/1982 | Willay | |
| 4,463,146 A * | 7/1984 | Donbar et al. | 526/142 |
| 4,664,624 A | 5/1987 | Dufresne | |
| 5,269,827 A * | 12/1993 | Lenke et al. | 65/178 |
| 5,315,091 A * | 5/1994 | O'Brien et al. | 219/385 |

FOREIGN PATENT DOCUMENTS

JP 59083716 A 5/1984

OTHER PUBLICATIONS

XRF Scientific Press Release, Mar. 1, 2010.*
Screen shots of Panalytical Videos of Eagon 2, Jul. 23, 2010 and Feb. 2011.*

* cited by examiner

Primary Examiner — Matthew Daniels
Assistant Examiner — Lisa Herring
(74) Attorney, Agent, or Firm — Barnes & Thornburg LLP

(57) ABSTRACT

A bead furnace has a furnace with a furnace chamber 4 and opening 6. A closure assembly 20 is provided on closure assembly 22. The closure assembly has a blank closure element 26 and an active closure element 32 on different sides of the closure assembly, each matching the opening 6. A crucible holder 44 with a detent for holding a crucible and a mold holder 60 for holding a mold are provided on the active face. The closure assembly moves between two states, a load state with the blank closure element 26 in the furnace opening and an operation state with the active closure element 32 in the furnace opening with the crucible and mold in the furnace. The closure assembly can agitate the crucible contents and then tip the crucible to pour fused contents into the mold.

15 Claims, 5 Drawing Sheets

BEAD FURNACE

The invention relates to a furnace and a method of operation of the furnace to produce beads.

The preparation of samples for X-ray fluorescence can be achieved in a number of ways. One approach to sample preparation is to fuse (melt) the sample and then to form a bead. In this context, a "bead" means a glass-like sample, which may typically be shaped as a disk. "Fuse" means to fully melt a sample to produce a substantially homogenous sample. This approach can overcome the problem of particle size variation and mineralogical effects in the original sample.

Fully automatic apparatus for preparing a bead is manufactured and sold by PANalytical BV under the trade name "Perl'X". The apparatus is a furnace which is controlled automatically.

U.S. Pat. No. 5,315,091 describes an oven for heating a crucible which can be used to form a bead for analysis. In one embodiment, the oven is cooled containing the crucible and casting dish. In another embodiment, the crucible is removed from the oven and turned to pour the molden sample into an acid solution. U.S. Pat. No. 5,315,091 describes a bead furnace with furnace chamber and opening, closure assembly with mounting, and a crucible holder and a mould holder on the opposite face of the furnace to the closure assembly.

U.S. Pat. No. 4,329,136 describes an apparatus for preparation of a sample which has an induction coil around a crucible.

According to the invention, there is provided a bead furnace according to claim 1.

By providing a closure assembly with two elements for sealing the furnace, and a suitable mounting, the closure assembly can be moved between two states, one with the blank element sealing the furnace and the active element exposed to allow the crucible with sample and a mould to be replaced, and one with the active element sealing the furnace to allow operation. The closure assembly, as well as having the function of sealing, also has an integral crucible drive to agitate a crucible held on a crucible holder and a mould holder for holding a mould so that a sample, once mixed in the furnace, can be poured onto a mould held by the mould holder by further operating the crucible drive.

In this way, efficient operation of the furnace is achieved, since the blank element seals the furnace during loading and unloading, and the complete apparatus is efficient.

Sample mixing may involve a rocking motion sideways, i.e. side to side, a rotation clockwise and counterclockwise, and/or shaking or rotation on an angle, or some combination of these or other agitation approaches.

Preferably, the crucible holder has a detent for securely holding a crucible, to allow the agitation and in particular the pouring operations to be conducted without the crucible falling from the crucible holder.

The detent may in particular have a pair of lugs extending from a ring. A crucible may be mounted with the body of the crucible extending through the crucible holder and with the rim or a locating ring (positioned around the circumference of the crucible) on the crucible holder, held by the lugs.

The closure assembly mounting may allow rotation of the closure assembly and motion of the closure assembly towards and away from the opening. In embodiments, this is achieved using a linear rail and a rotary drive.

An optical detector may be provided to check that the mould is in position before operation of the machine.

An automatic controller may be provided that controls the drive.

In another aspect, there is provided a method of operation of the bead[1] furnace as set out in claim 10.

For a better understanding of the invention, embodiments will be described, purely by way of example, with reference to the accompanying drawings, in which FIG. 1 shows a general overview of a first embodiment of the bead furnace;

The figures are schematic and not to scale. Like or similar components have been given the same reference number in different Figures and the description relating thereto is not necessarily repeated.

Figure 1:
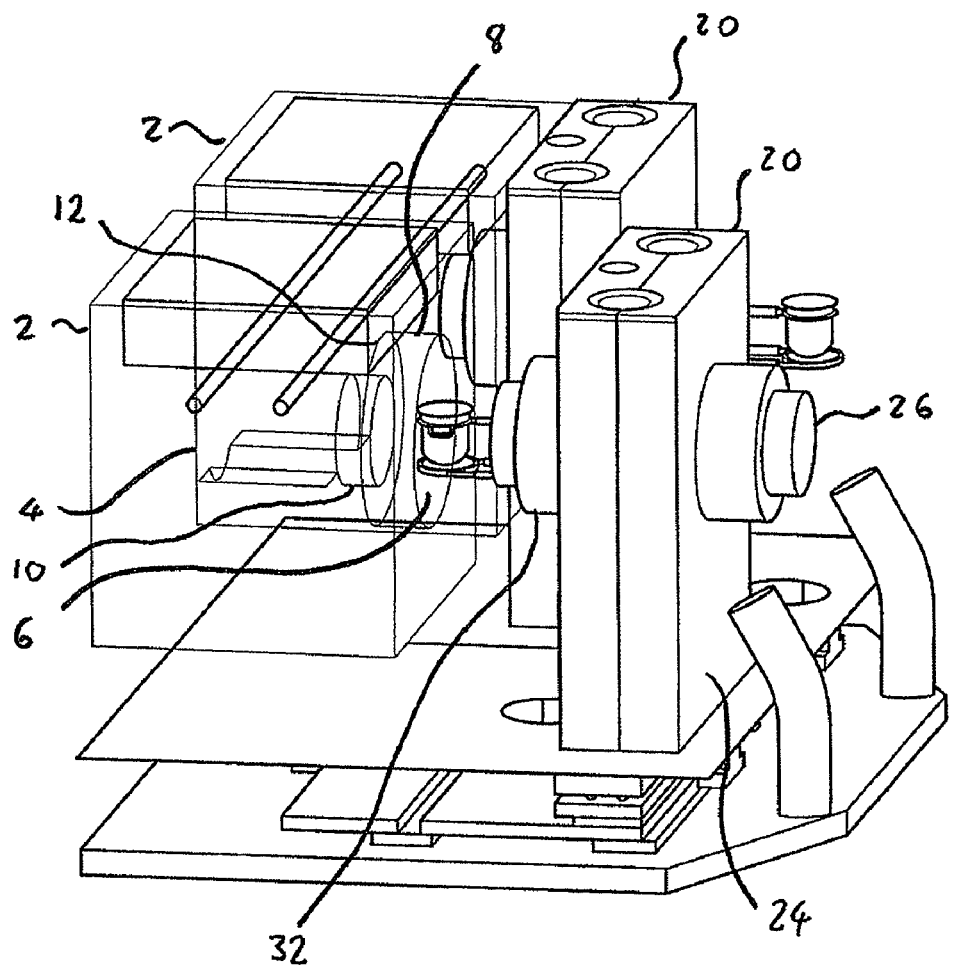
Figure 6:
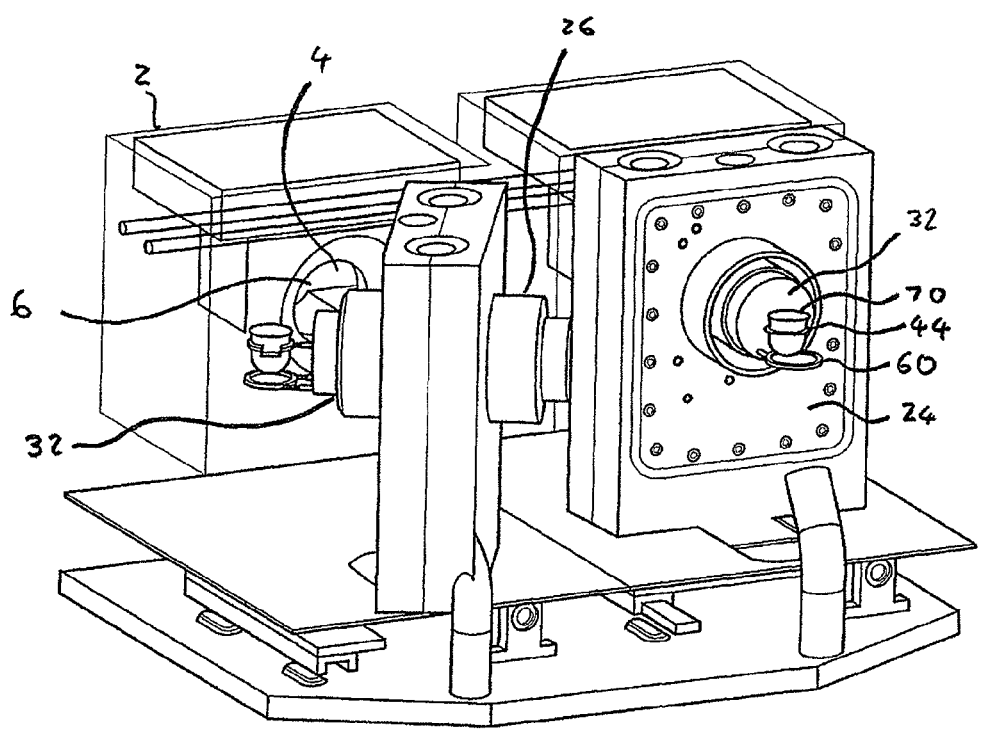
FIG. 6 shows the above closure assembly in use.

Referring to FIGS. 1 and 6, a furnace includes a pair of housings 2, each with a furnace chamber 4 having an opening 6. The opening has an outer cylindrical region 8 having a first radius and an inner cylindrical region 10 having second radius, the inner and outer cylindrical regions defining a step 12 between them. The furnace chamber includes a heater (not shown) connected to a controller. The controller controls the heater to maintain a desired temperature in the furnace; those skilled in the art are aware of a number of heating methods and control methods that can be applied and these will not be described further.

Each furnace is closed by a respective closure assembly 20 mounted on a closure assembly mounting 22.

The closure assembly includes a closure body 24 being of generally flat form and having a blank closure element 26 on one side of the body and an active closure element 32 on the opposite side of the body.

Figure 2:
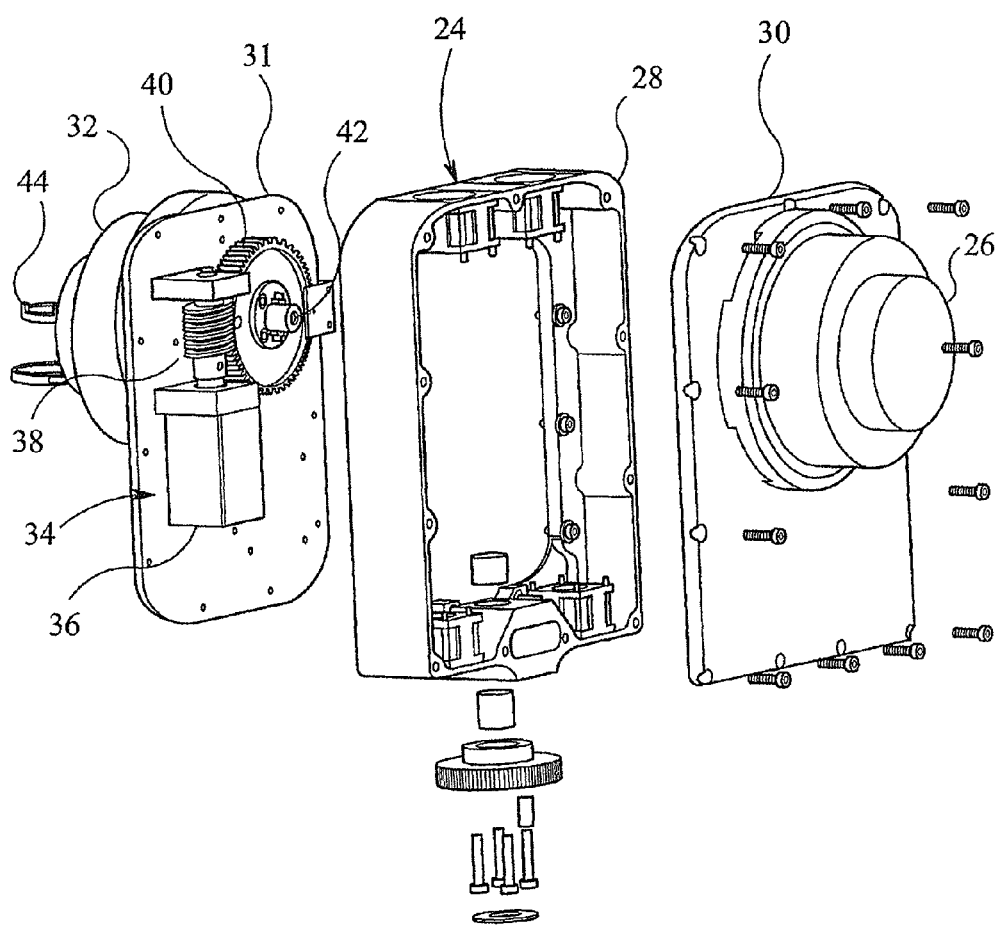
FIG. 2 shows a closure assembly in exploded perspective view.

The closure assembly is shown in more detail in exploded view in FIG. 2.

The closure body 24 is formed of a cast aluminium gearhead 28. A blank plate 30 is mounted on one side of gearhead 28, the blank closure element 26 being mounted on the outside of the blank plate 30, i.e. the side facing away from the gearhead 28. The blank closure element is a stepped cylindrical shape which closely matches the shape of the opening 6 so that the blank closure element 26 can seal the furnace. The blank closure element 26 is made of refractory material so that it is not damaged by the heat of the furnace.

The opposite side of the gearhead 28 has an active plate 31. The active closure element 32 is mounted on the front of the active plate 31; the shape of the active closure element matches the shape of the opening 6.

The rear of the active plate supports crucible drive 34. This includes a 3 phase brushless dc motor 36 with Hall effect feedback, a worm gear 38 connected to and driven by the dc motor 36, a drive gear 40 connected to and driven by the worm gear, and a central grip 42 in the centre of the drive gear 40 for gripping a crucible holder 44. The central grip 42 has a keying/spring detent mechanism.

Figure 3:
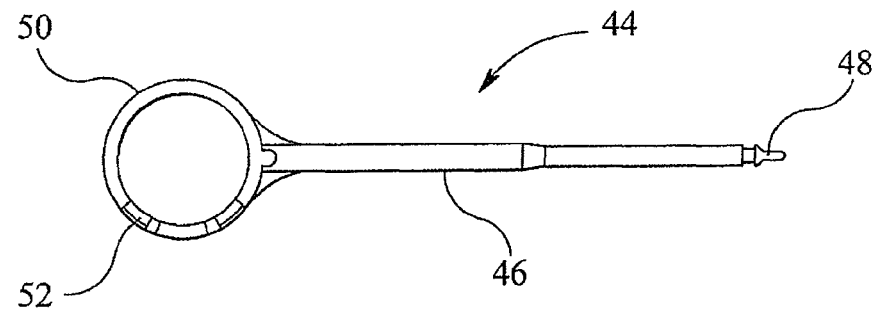
FIG. 3 shows a crucible holder in top view.
Figure 4:
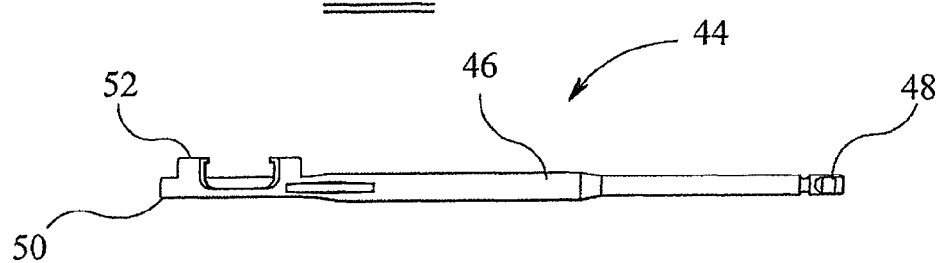
FIG. 4 shows the crucible holder of FIG. 3 in side view.

The crucible holder 44 is shown in top view in FIG. 3 and in side view in FIG. 4. The crucible holder 44 includes a longitudinal shaft 46 with a grip region 48 at its inner end adapted to engage with the central grip 42. The opposite end of the crucible holder 44 includes a crucible mount 50 in the form of a circular ring with two lugs 52 extending from the crucible mount 50. The two lugs are on the same side of a line extending along the longitudinal shaft, the centres of the two lugs subtending an angle of 80° of the ring and each lug covering 25°. The two lugs are adapted to engage with the rim, or a locating ring (positioned around the circumference of the crucible), of a crucible mounted in the crucible holder with the rim or locating ring between the lugs and the crucible holder ring.

Figure 5:
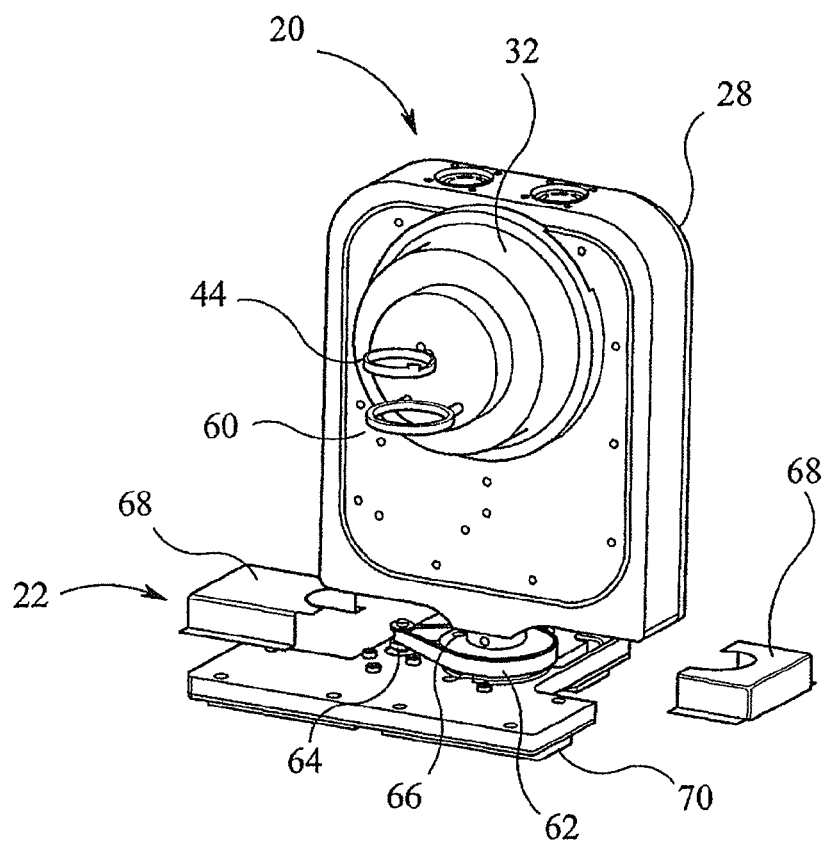
FIG. 5 shows the closure assembly of FIG. 2 on a closure assembly mounting.

The closure assembly 20 and closure assembly mounting 22 are shown in FIG. 5. The active closure element 32 can be clearly seen. Crucible holder 44 is mounted with its longitudinal shaft 46 extending through the active closure element 32 to engage with the central grip 42 (FIG. 2).

Also shown is mould holder 60, which likewise extends from the active closure element 32 to engage in a keying/spring detent mechanism mounted upon the active enclosure element 32.

Figure 7:
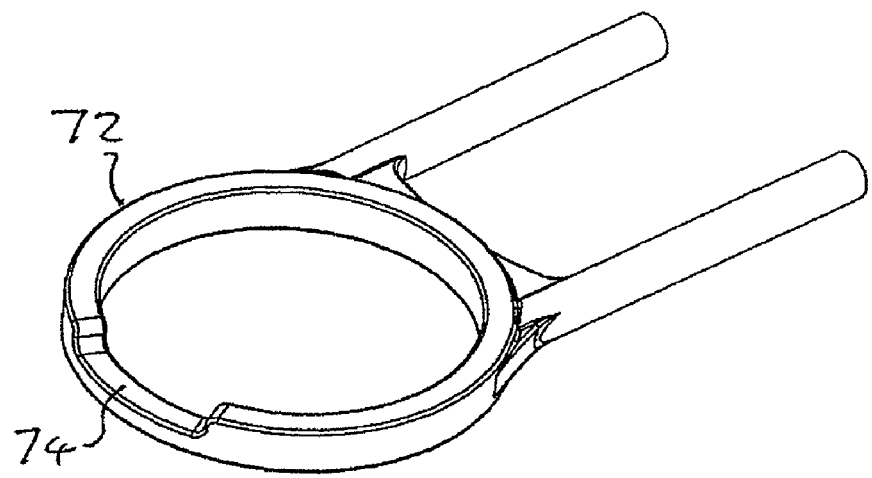
FIG. 7 illustrates a mould holder.

The mould holder 60 is shown in more detail, in perspective view, in FIG. 7. Note that the mould holder includes a ring 72 having an indentation 74 at the front of the ring to make it easier to insert and remove a mould in the holder.

The function of mould holder 60 is to hold a mould under the crucible.

The closure assembly mounting 22 is capable of rotating the entire closure assembly 20 which is mounted on gearhead pulley 62 driven by gearhead drive pulley 64. A dowel pin 66 is mounted in gearhead pulley 62; this prevents rotation of the closure assembly 20 by more than about 180°.

A shield 68 (shown retracted) protects the gearhead pulley 62 and gearhead drive pulley.

The closure assembly mounting includes lower rails which allow it to be driven linearly in the direction along the rails, which is aligned with the central axis of opening 6 so that the active and passive closure elements can be introduced linearly into the opening 6.

In use, referring to FIG. 6, the closure assembly 20 is mounted in a load state with the blank closure element 26 closing the opening 6 of furnace 4 and with the active closure element 32 facing outwards and hence presenting crucible holder 44 and mould holder 60 to the user. The right hand furnace of FIG. 6 is in this state.

A crucible 70 is mounted on crucible holder 44 and held between lugs 52 (FIG. 3) and the ring-shaped crucible mount 50. A mould is likewise mounted on mould holder 60. A sample of material to be tested is provided in the crucible.

When the crucible and mould are mounted, the controller 16 is operated to move the closure assembly 20 outwards from the furnace to disengage the blank closure element 26 from the opening 6.

Then, drive pulley 64 is operated to rotate the gearhead pulley 62 to rotate the closure assembly 20 by 180°, so that the active closure element 32 faces the opening 6.

The left hand furnace of FIG. 6 illustrates this intermediate position in which the active closure element 32 is being moved into the furnace opening 6.

The closure assembly 20 is then moved to close the opening 6 by active closure element 32 to introduce the crucible and mould into the chamber in the operation position.

The furnace may be kept at a temperature of 700° C. to 1200° C. to fuse (melt) the sample. As the sample is melting, the crucible drive as actuated to mix the crucible contents.

Once the sample is fused, the drive is activated to rotate the crucible by more than 90° so that the fused sample is poured into the mould to form beads.

The controller then operates the closure assembly mounting to reverse the motion of the closure assembly to move the closure assembly from the operation state back to the original load state with the crucible and mould accessible. In this load state, the blank closure member 26 seals the furnace opening 6 to prevent heat loss.

The formed beads once cooled and solidified can then be removed from the mould.

In a development, the apparatus includes additionally an optical detector for detecting a mould positioned in the mould holder.

In a particular embodiment, the optical detector is mounted in a position such that it can detect the mould is positioned in the mould holder when the closure assembly is in a position halfway between the load and operation positions, i.e. with the closure assembly rotated 90° from both the load and operation positions.

In use, instead of rotating the closure assembly by 180°, the closure assembly is first rotated by 90°. The crucible drive is then activated to move the crucible holder and hence the crucible. If the optical detector detects crucible movement, the operation is reversed and the apparatus returned to the load position to load a mould. If on the other hand, the optical detector does not detect crucible movement, the closure assembly is rotated by a further 90° to complete the 180° rotation before closing the opening with the active closure member as above.

In this way, inadvertent operation of the apparatus without a mould is avoided.

Figure 8:
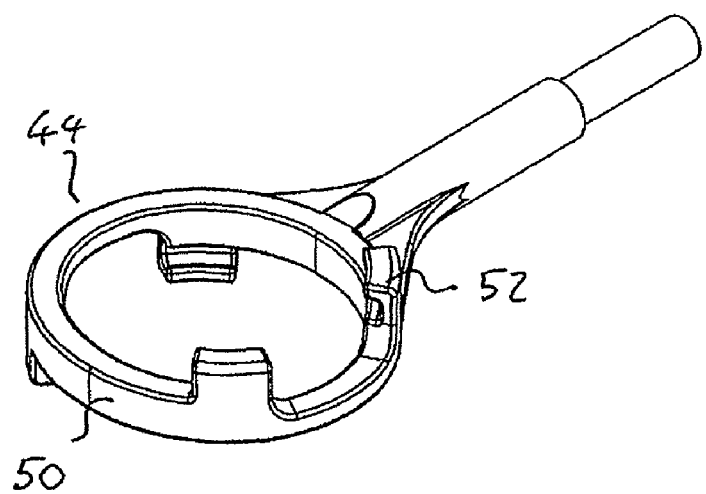
FIG. 8 illustrates a crucible holder according to a second embodiment of the invention.

FIG. 8 illustrates an alternative embodiment of the crucible holder 44. Unlike the crucible holder illustrated in FIG. 4, this crucible holder has a first pair of lugs 52 on the upper surface of ring 50 and a second pair of lugs 52 on the lower surface of ring 50. This allows the crucible holder to be mounted either way up reducing the possibility of operator error mounting the holder the wrong way up. Further, the crucible holder can be used in either orientation extending the life of the crucible holder—in the event of any sagging occurring after extended use, the crucible holder can be inverted which should allow the sagging to correct itself over time.

It should be noted that the above-mentioned embodiments illustrate rather than limit the invention, and that those skilled in the art will be able to design many alternative embodiments without departing from the scope of the appended claims.

In particular, an alternative embodiment may have a pair of active closure elements 32 one on each side of the closure body 24 so that a crucible can be mounted on both faces of closure body 24.

The furnace described above has a pair of furnace chambers 4. Alternative designs may have a single furnace chamber, or multiple furnace chambers.

For example, although the blank and active closure elements are on opposite faces of the closure assembly, alternatives may allow these to be on adjacent faces.

The specific sizes and arrangements of the elements described can be varied. For example, the crucible size and shape may vary. Further, although in the embodiment the lugs 52 are spaced at an angle of 80°, this may be varied as required. Similarly, the size and shape of the lugs may be varied to ensure a suitable grip to the crucible.

The type of furnace, heating and control arrangements can be varied as required—the temperature required and the time will vary depending on the sample in a way known to those skilled in the art.

A single continuous linear and rotary motion can move the closure element between load and operation states, or the motion can be carried out in discrete steps.

The furnace chamber 4 may have a number of openings 6 to enable single or multiple sample preparations by a number of active closure elements 32.

The closure body 24 may support two active closure elements 32 and in turn active plate 31 mounted on either side to enable continuous preparations.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A bead furnace, comprising
a furnace chamber (4) having an opening (6);
a closure assembly (20); and
a closure assembly mounting (22) for the closure assembly, wherein the closure assembly (20) comprises:
a closure body (24) having a crucible drive (34);
a first closure element (26,32) on a first side of the body, the first closure element being adapted to seal the opening with the closure assembly in a load state;
an active closure element (32) on a second side of the body, the active closure element being adapted to seal the opening with the closure assembly in an operation state;
a mould holder extending (60) from the active closure element; and
a crucible holder (44) extending from the active closure element and connected to the crucible drive for agitating a crucible held in the crucible holder and pouring contents of a crucible held in the crucible holder into a mould held in the mould holder; and
a closure drive (62,64,66) for driving the closure assembly on the closure assembly mounting between the load state with the blank closure element sealing the opening and the operation state with the active closure element sealing the opening.

2. A bead furnace according to claim 1, wherein the crucible holder (44) includes a crucible detent (52) for locking engagement with a crucible mounted on the crucible holder.

3. A bead furnace according to claim 2, wherein the crucible holder includes a crucible mount (50) in the form of a ring and the crucible detent (52) comprises a pair of lugs extending from the crucible mount for holding a rim or a locating ring positioned around the circumference of the crucible between the lugs and the crucible holder.

4. A bead furnace according to claim 2 wherein the crucible holder includes a crucible mount (50) in the form of a ring having an axis, the crucible holder being mountable with either face of the ring upwards, and the crucible detent comprises:
a first pair of lugs (52) extending from the crucible mount extending from the ring for holding a crucible when the crucible mount is mounted with the first pair of lugs facing upwards; and
a second pair of lugs (52) extending from the crucible mount extending from the ring in the opposite axial direction to the first pair of lugs for holding a crucible when the crucible mount is mounted with the second pair of lugs facing downwards.

5. A bead furnace according to claim 1;
wherein the crucible holder (44) extends through the active closure element to the crucible drive; and
wherein the crucible drive (34) includes a motor (36) contained within the closure body and a grip (42) for engaging with the crucible holder.

6. A bead furnace according to claim 1, wherein the closure assembly mounting (22) comprises a linear rail for allowing sliding motion towards and away from the opening and a rotary drive permitting 180° rotation of the closure assembly.

7. A bead furnace according to claim 1 further comprising an optical detector for detecting the presence of a mould positioned upon the mould holder.

8. A bead furnace according to claim 1, further comprising an automatic controller adapted to control the crucible drive and the closure drive.

9. A bead furnace according to claim 8, wherein the automatic controller is adapted to control the closure drive to load a crucible (70) containing a sample on the crucible holder;
to load a mould on the mould holder with the closure assembly in the load state;
operate the closure drive (62,64,66) to bring the closure assembly (20) into the operation state with the crucible in the furnace;
operate the crucible drive (34) to agitate the crucible;
operate the crucible drive (34) to rotate the crucible at least 90° to pour the sample in a fused state onto the mould to form glass beads; and
operate the closure drive (62,64,66) to bring the closure assembly into the load state.

10. A bead furnace according to claim 1 wherein the first closure element (26) is a blank closure element without a crucible holder or mould holder.

11. A bead furnace according to claim 1 wherein the first closure element (32) is a further active closure element with a further crucible holder and a further mould holder.

12. A method of operation of a bead furnace comprising:
loading a crucible (70) containing a sample on the crucible holder (44) and loading a mould on the mould holder (60) with the closure assembly (20) in the load state;
operating the closure drive (62,64,66) to bring the closure assembly (20) into the operation state with the crucible in the furnace;
operating the crucible drive (34) to agitate the crucible;
operating the crucible drive (34) to rotate the crucible at least 90° to pour the sample in a fused state onto the mould to form glass beads; and operating the closure drive (62,64,66) to bring the closure assembly (20) into the load state; wherein the bead furnace comprises:
a furnace chamber (4) having an opening (6); a closure assembly (20); and a closure assembly mounting (22) for the closure assembly, wherein the closure assembly (20) comprises: a closure body (24) having a crucible drive (34);
a first closure element (26,32) on a first side of the body, the first closure element being adapted to seal the opening with the closure assembly in a load state;
an active closure element (32) on a second side of the body, the active closure element being adapted to seal the opening with the closure assembly in an operation state:
a mould holder extending (60) from the active closure element; and a crucible holder (44) extending from the active closure element and connected to the crucible drive for agitating a crucible held in the crucible holder and pouring contents of a crucible held in the crucible holder into a mould held in the mould holder; and
a closure drive (62,64,66) for driving the closure assembly on the closure assembly mounting between the load state with the blank closure element sealing the opening and the operation state with the active closure element sealing the opening.

13. A method of operation according to claim 12, wherein the closure assembly mounting comprises a linear rail for allowing sliding motion towards and away from the opening and a rotary drive permitting 180° rotation of the closure assembly; and the step of operating the closure drive to bring the closure assembly (20) into the operation state comprises:

moving the closure assembly (20) away from the furnace along the linear rail;

rotating the closure assembly 180°; and moving the closure assembly (20) towards the furnace (4) along the linear rail until the active closure element (32) seals the opening.

14. A method according to claim 13, wherein the step of rotating the closure assembly 180° comprises:

rotating the closure assembly to bring the crucible and mould into alignment with an optical detector;

operating the crucible drive (34) to agitate the crucible;

detecting whether a mould is present in the mould holder (60);

if a mould is present, completing the 180° rotation; and if a mould is not present returning the closure assembly back to the load state.

15. A method according to claim 12, further comprising loading a further crucible (70) containing a further sample on the further crucible holder and loading a further mould on the further mould holder with the closure assembly in the operation state.

* * * * *